(12) United States Patent
Varner (10) Patent No.: US 6,459,838 B1
(45) Date of Patent: Oct. 1, 2002

(54) METHOD FOR MAKING V-SHAPED HIGHLY BIREFRINGENT OPTICAL FIBERS

(75) Inventor: Wayne F. Varner, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/515,448

(22) Filed: Feb. 29, 2000

(51) Int. Cl.⁷ .................................................. G02B 6/02
(52) U.S. Cl. ....................................................... 385/123
(58) Field of Search ........................... 385/123, 66, 83; 65/4.21

(56) References Cited

U.S. PATENT DOCUMENTS

| | | | | |
|---|---|---|---|---|
| 4,179,189 A | * | 12/1979 | Kaminow et al. | 385/128 |
| 4,395,270 A | * | 7/1983 | Blankenship et al. | 65/403 |
| 4,529,426 A | * | 7/1985 | Pleibel et al. | 438/234 |
| 4,668,264 A | * | 5/1987 | Dyott | 65/4.21 |
| 4,762,387 A | | 8/1988 | Batdorf et al. | 350/96.2 |
| 4,859,223 A | * | 8/1989 | Kajioka et al. | 65/403 |
| 4,896,942 A | * | 1/1990 | Onstott et al. | 385/127 |
| 4,950,318 A | * | 8/1990 | Dyott | 65/4.21 |
| 5,276,751 A | * | 1/1994 | Grard et al. | 385/66 |
| 5,656,888 A | * | 8/1997 | Sun et al. | 313/503 |

FOREIGN PATENT DOCUMENTS

| | | | | |
|---|---|---|---|---|
| EP | 0 212 954 | | 3/1987 | C03B/37/025 |
| EP | 0 098 190 | | 9/1987 | G02B/6/38 |
| EP | 0 215 674 B1 | | 9/1993 | G02B/6/10 |
| GB | 2 012 983 | | 1/1978 | |
| GB | 2 012 983 | * | 8/1979 | |
| JP | 58224306 | | 12/1983 | G02B/5/14 |
| JP | 60108807 | | 6/1985 | G02B/6/16 |
| JP | 61179403 | | 8/1986 | G02B/6/16 |

OTHER PUBLICATIONS

Okamoto et al., "High–Birefringent Polarizing Fiber With Flat Cladding" *Journal of Lightwave Technology*, LT–3(4):758–762, Aug. 1985.*

Pigram et al., *Optical Engineering*, 1994, 33(8):2594–2599, Aug., "Keyed Optical V–Fiber to Silicon V–Groove Interconnects".*

Ramaswamy et al., "Single Polarization Optical Fibers–Exposed Cladding Technique" *Applied Physics Letters, 1978*, 33(9):814–816.*

Paul J. Pigram, et al., "*Keyed Optical V–Fiber to Silicon V–Groove Interconnects*", Optical Engineering, Aug. 1994, vol. 33, No. 8, pp. 2594–2599.

V. Ramaswamy, et al., "*Single Polarization Optical Fibers: Exposed Cladding Technique*", Applied Physics Letter, Nov. 1, 1978, vol. 33, No. 9, pp. 814–816.

Katsunari Okamoto, et al., "*High–Birefringence Polarizing Fiber with Flat Cladding*", 1985 IEEE, Journal of Lighwave Technology, Aug. 1985, vol. LT–3, No. 4, pp. 758–762.

* cited by examiner

Primary Examiner—Ellen E. Kim
(74) Attorney, Agent, or Firm—Fish & Richardson P.C.

(57) ABSTRACT

A method for making a V-shaped highly birefringent optical fiber includes providing a preform with a substantially circular cross section. The outer surface of preform is modified to create a shaped preform with a substantially V-shaped cross section. The shaped preform is then drawn at a temperature and draw rate sufficient to provide an optical fiber with the V-shaped cross section of the shaped preform.

23 Claims, 9 Drawing Sheets

METHOD FOR MAKING V-SHAPED HIGHLY BIREFRINGENT OPTICAL FIBERS

TECHNICAL FIELD

This invention relates to the field of fiber optics. More particularly, this invention relates to highly birefringent optical fibers and methods for their manufacture.

BACKGROUND

Optical fibers that maintain a polarized signal in an optical fiber, referred to as polarization maintaining (PM) fibers, are described, for example, in U.S. Pat. No. 4,896,942. Optical fibers that polarize light from a non-polarized or partially polarized light source, referred to as polarizing (PZ) optical fibers, are described, for example, in U.S. Pat. No. 5,656,888. PM and PZ fibers are used in many different applications, such as sensors, inline fiber device, Raman lasers, and the like. To polarize or maintain a polarized signal in an optical fiber, the light guiding properties of the core of the optical fiber must be highly birefringent. An elliptical core may cause the anisotropic fiber geometry responsible for this high birefringence. However, this anisotropy is more commonly achieved by depositing or locating adjacent the core diametrically opposed sections of cladding material(s) with substantially higher or lower thermal coefficients of expansion than the outer fiber regions. The diametrically opposed regions define one of the highly birefringent fiber's two transverse orthogonal polarization axes and decouple the components of the wave traveling along the fiber. In a polarizing fiber, one of the decoupled components is leaked to the cladding and completely attenuated, leaving a single linearly polarized wave. In contrast, a polarization maintaining fiber retains both of the orthogonal signal components with virtually no cross-coupling or loss of signal strength.

Typical highly birefringent fiber designs have two perpendicular planes of symnmetry. One plane of symmetry passes through the center of the fiber core and its two diametrically opposed cladding regions. The second plane of symmetry, which is normal to the first plane of symmetry, also passes through the center of the fiber core.

Figure 1A:
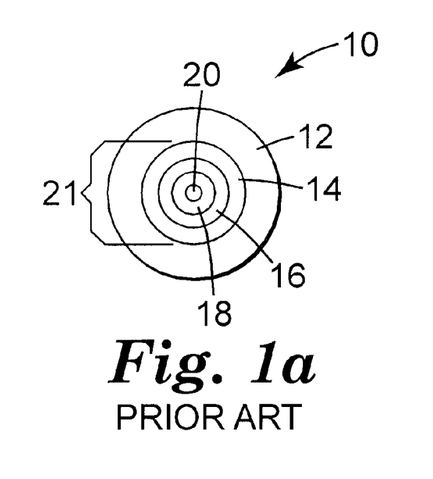
FIGS. 1(a)–1(c) is a/series of cross-sectional views of an optical fiber preform as it proceeds through a process for marking a highly birefringent, elliptically clad optical fiber.
Figure 1B:
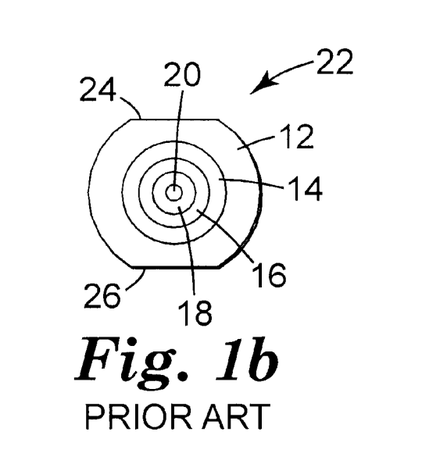
Figure 1C:
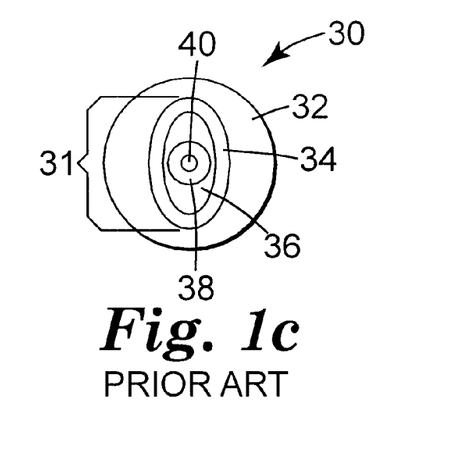

Referring to FIGS. 1(a)–(c), a conventional modified chemical vapor deposition (MCVD) process is shown that may be used to make a collapsed optical fiber preform to be drawn into a PM or PZ optical fiber. Referring to FIG. 1(a), a starting preform 10 includes a fused silica support tube 12 with a known refractive index. An optional outer cladding region 14 made of materials with a refractive index either less than or equal to the refractive index of the support tube 12 is deposited on the inside of the tube 12. The outer cladding region 14 is typically a relatively pure deposition region that prevents migration of contaminants from the support tube 12 into the interior regions of the optical fiber. Inside the outer cladding region 14 is a stress region 16 formed by layers of glass with a high thermal coefficient of expansion. The stress region 16 has an index of refraction that approximately matches the index of refraction of the cladding region 14. In longer wavelength PM designs, an optional inner cladding (Iclad) region 18 may be incorporated between the stress region 16 and a core region 20. The inner cladding region 18 has an index of refraction that is closely matched to the index of refraction of the outer cladding 14 in these PM designs. In PZ designs, the inner cladding 18 is normally a narrow depressed index region. The core region 20 has an index of refraction sufficiently higher than the index of refraction of the surrounding regions to ultimately create a waveguiding region 21 needed for single mode operation at the design wavelength. The waveguiding region 21 typically includes the core 20 and the region immediately adjacent the core, but FIG. 1(a) illustrates a more general case in which the waveguiding region 21 includes the core 20 and at least one other region between the core 20 and the support tube 12.

Referring to FIG. 1(b), the preform 10, which has a substantially circular cross-section, is then ground equally on opposite sides 24, 26 to form a ground preform 22 with a non-circular outer periphery, also referred to herein as a non-circular cross-sectional geometry. In this grinding step a substantial amount of the wall thickness of the support tube 12 is removed, and, in some instances, even the outer cladding region 14 may be ground away. The exact amount of material removed in the grind will affect the cutoff wavelength characteristics and the polarizing holding properties of the fiber that is ultimately drawn from the ground preform 22, and as such is a carefully controlled parameter in the fiber manufacturing process.

Referring to FIG. 1(c), the ground preform 22 is drawn at high temperature (typically, about 2100° C. to about 2200° C.), which causes the ground sides of preform 22 to "circularize" into an optical fiber 30 with a substantially circular cross-section. The circularized optical fiber 30 has an outer cladding 34 and a stress region 36, each with a substantially elliptical cross-section, surrounding an inner cladding region 38 and a core region 40, each with a substantially circular cross-section. Normally, the stress region 36 is made of low melting temperature materials that become fluid during the draw process. This allows the relatively soft outer cladding 34 and the fluid stress region 36 to assume an elliptical cross-sectional shape as the outer fiber region made up of the fused quartz support tube 32 circularizes due to surface tension effects. The inner cladding region 38, if present, retains its substantially circular cross-section, as does the core region 40, to provide, along with the elliptical outer cladding and stress regions, a waveguiding region 31.

The waveguiding region of the PM or PZ optical fiber may also have a core region with a non-circular cross section, such as an ellipse or a rectangle. However, a fiber with a non-circular core design is difficult to splice or connect to conventional round core fibers and generally does not develop sufficient birefringence for more demanding applications.

To maintain or preserve the polarization properties of a signal in an optical fiber, the optical properties of the PM or PZ fiber must be anisotropic. The differing cross-sectional profiles of the layers of the waveguiding region formed by the cladding and core regions in the fiber define two transverse orthogonal axes, which permit the de-coupling of waves polarized along those axes. If a signal launched into these fibers has its polarization aligned with one of these transverse axes, the polarization-tends to remain aligned with that axis as the signals are propagated though the fiber. This preserves the polarization of the signal.

PM and PZ fibers often require precise alignment of their transverse orthogonal axes when they are joined to other similar fibers or interfaced to other polarized sources or detectors. For example, to join a PZ fiber with a polarized light source having a known polarization orientation, a polarizer is used to launch light into the fiber, and either the fiber or the polarizer is rotated to identify the axes of maximum and minimum light transmission. The axis of maximum transmission is then aligned with the known polarization orientation of the source. The ratio between the maximum light transmission and the minimum light transmission is referred to as the extinction ratio. To join a PM fiber with another PM fiber, a polarized source or a detector, a similar procedure is used, which requires a polarizer at the fiber input and an analyzer at the fiber output. In this process both the analyzer and the polarizer are rotated to locate the maximum and minimum transmitted power. Both of these procedures require time, optical sources, detectors, lenses, translation stages etc. to identify the axes. Lens tracing techniques can also be used in which light is injected through the side of the fiber and the intensity pattern is scanned on the opposite side to identify the asymmetry. Again, this requires many of the same active components.

SUMMARY

In one aspect, this invention is a method for making an optical fiber, which includes providing a preform with a substantially circular cross section. This preform has a waveguiding region with a core and a cladding adjacent the core. The outer surface of the preform is modified to create a preform profile with a cross sectional shape substantially like the letter V. An optical fiber is then drawn from the shaped preform at a temperature and draw rate sufficient to provide an optical fiber with the V-shaped cross section of the shaped preform.

In another aspect, this invention is also directed to a highly birefringent optical fiber including a substantially V-shaped outer cross-sectional geometry.

In another aspect, the invention is further directed to a method for connecting a highly birefringent optical fiber with a substantially V-shaped cross section to an alignment portion of a device. The optical fiber has a substantially V-shaped outer cross-sectional geometry. The device includes a connection region shaped to accept the substantially V-shaped outer periphery of the optical fiber, and the optical fiber is engaged with the connection region in the device. The interconnection of the fiber and the device rotationally aligns the optical fiber with respect to the device, so additional active alignment procedures are not required.

The inventive method makess possible the manufacture of a highly birefringent optical fiber with a substantially V-shaped cross-sectional geometry. The V-shaped fiber may be made with a waveguiding region having a stress-applying region with a substantially elliptical cross-section and a core with a substantially circular cross-section to provide high birefringence. This method provides control over the cross-sectional shape of the fiber that is independent of the shape of the highly birefringent waveguiding region. The V-shaped cross-sectional shape of the optical fiber made by this method preferably has a known orientation to the transverse orthogonal axes of the waveguiding region of the fiber. The non-circular cross-sectional shape of the fiber provides an easily visible, "passive" means of locating the fiber's transverse, orthogonal birefringent axes. This allows the fibers to be easily aligned with other similarly shaped birefringent fibers, sources or detectors using the precision alignment characteristics of a V-shaped groove, thereby avoiding time consuming alignment steps and expensive equipment.

The details of one or more embodiments of the invention are set forth in the accompanying drawings and the description below. Other features, objects, and advantages of the invention be parent from the description and drawings, and from the claims.

DESCRIPTION OF THE DRAWINGS

Like reference symbols in the various drawings indicate like elements.

DETAILED DESCRIPTION

Figure 2A:
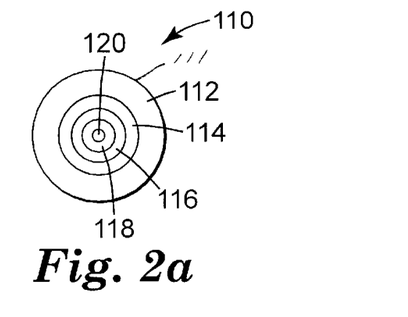
FIGS. 2(a)–2(c) is a series of cross-sectional views of an optical fiber preform as it proceeds through an embodiment of the process of the invention for making a V-shaped, highly birefringent, elliptically clad optical fiber.

Referring to FIGS. 2(a)–2(e), a fabrication process is shown for making an elliptically clad, highly birefringent optical fiber with a substantially V-shaped cross sectional geometry. FIG. 2(a) shows an optical fiber preform 110 made by the modified chemical vapor deposition (MCVD) process that includes a support tube 112.

The preform shown in FIG. 2(a) is made by the MCVD process and includes a core region and cladding regions with substantially circular cross sections. Further processing of the preform 110 results in an elliptically clad, substantially circular preform as shown in FIG. 2(c). However, any preform with a substantially round cross section that is designed to produce an optical fiber with highly birefringent, single mode operation, may be used. Examples include preforms with diametrically opposed stress-applying regions in the cladding, or preforms with a core having a substantially elliptical cross section. Any known process may be used to make these preformns. For example, a rod in tube or outside vapor deposition (OVD) process may be used to form a PANDA preform with a substantially circular cross section, or a MCVD or OVD process may be used to form a bow tie preform with a substantially circular cross section, or MCVD may be used to fabricate a preform with a substantially circular cross sectional shape having a core with a substantially elliptical cross sectional shape.

Figure 2B:
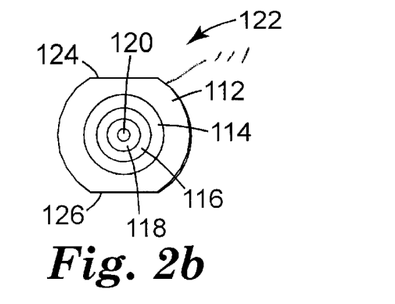
Figure 2C:
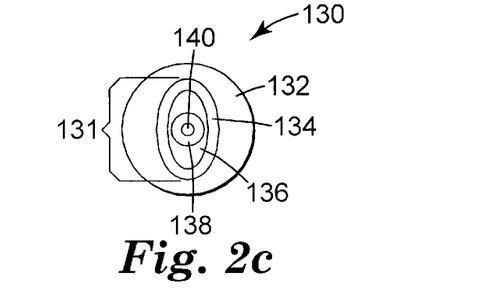

As shown in FIG. 2(b), the outer surface of the preform 111 is then modified to create a ground preform 122 with a non-circular cross-section. In this embodiment, the preform 110 is ground equally on opposite sides to create opposed substantially planar surfaces 124 and 126.

Next, referring to FIG. 2(c), the ground preform 122 is heated to about 2200° C. by a slowly traversing torch to produce a substantially circularized preform 130. If the preform 122 is quite large, a concurrent stretching step is useful to reduce the heat required to successfully circularize the preform. Depending on the traverse speed, size of the preform, composition and thickness of the starting tube and deposited regions, and degree of stretch, the preform 130 may have a substantially circular cross-section or a substantially oval shaped cross-section. In both cases, this step is referred to as "circularizing," which creates a stress region 136 and an outer cladding 134 with a substantially elliptical cross-section that would normally occur during the final draw of the optical fiber (See FIG. 1(c)). The core 140 and the optional inner clad 138 have a substantially circular cross-section, and the support tube 132 has a substantially circular periphery. The elliptical stress region 136 and the outer cladding 134, along with the circular core 140 and the inner clad 138, provide a waveguiding region 131 to support single mode operation in the optical fiber that will ultimately be drawn from the preform 130.

The polarization axes of the circularized preform 130 are located by viewing the preform 130 radially in a polarimeter or using a preform profiler to identify the azimuthal locations of the transverse, orthogonal, major and minor axes of the waveguiding region 131 from the geometry of the internal elliptical regions 134, 136. If the preform 130 has a slightly oval shaped cross-section, the transverse polarization axes can be found by measuring the external diameter of the preform—the major axis of the stress ellipse corresponding to the minimum diameter of the circularized preform and the minor axis of the stress ellipse to the maximum diameter of the preform.

In an alternative not illustrated in FIG. 2, the transverse polarization axes of the preform 130 may easily be found after circularization by creating or leaving an alignment feature on the outer surface of the ground preform 122, such as, for example, by leaving a short length of the preform's outer periphery flat. The alignment feature provides precise keying of the transverse polarization axes that is particularly useful for locating the final grinds shown in FIG. 2(d).

Figure 2D:
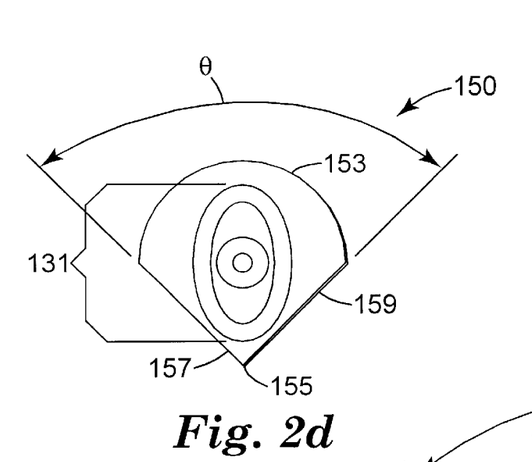

Referring to FIG. 2(d), the substantially circular or oval cross-sectional shape of the circularized preform 130 is then altered to create a preform 150 with a substantially V-shaped cross sectional profile. The V-shaped portion of the preform 150 creates an alignment feature that is preferably related to the transverse polarization axes of the preform, although such an arrangement is not required. Typically, a portion of the outer surface of the support tube 132 is removed by mechanical grinding or chemical etching to alter the circular cross-sectional shape of the preform 130.

In the embodiment of FIG. 2(d), the preform 130 is ground to create a second ground preform 150 with a substantially V-shaped cross-section. The embodiment illustrated in FIG. 2(d) includes substantially planar surfaces 157, 159 and a substantially arcuate surfaces 53. The planar surfaces 157, 159 can be any convenient depth and only affect the size of the flat dimension on the final fiber subsequently drawn from the second ground preform 150. The planar surfaces 157, 159 are inclined at an angle 0 that may be varied depending on the intended application. A vertex 155 may be sharp for a deep grind or arcuate in the more common shallow grind.

Figure 2E:
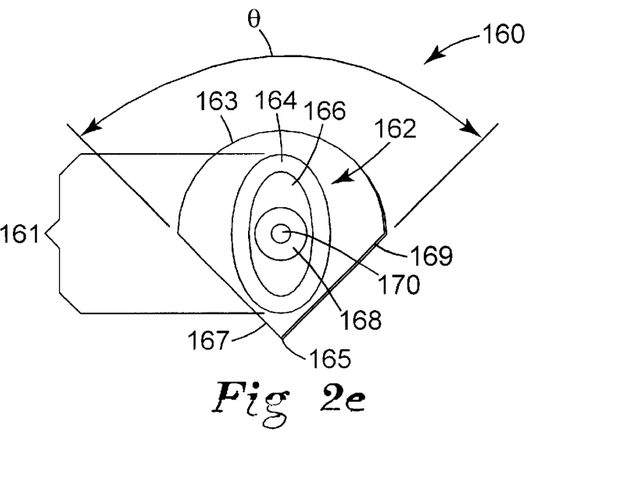

Finally, referring to FIG. 2(e), the second ground preform 150 is drawn to create a highly birefringent optical fiber 160 with a substantially V-shaped cross-section. The fiber 160 is drawn at high tension at a relatively low temperature and/or high speed sufficient to retain the cross-sectional features of the preform 150. Typically, depending on the composition of the layers in the preform, the draw rate, and the intended final shape of the optical fiber, the draw temperature ranges from about 1600° C. to about 2100° C., and a temperature of about 2000° C. is preferred. The draw rate may vary widely depending on the preform composition, the draw temperature, and the intended final shape of the optical fiber, but a draw rate of about 5 m/min to about 200 m/min is acceptable, and a draw rate of about 100 m/min is preferred.

The drawn fiber 160 includes a support tube material region 162 with a substantially V-shaped cross section, including substantially planar regions 167, 169 and substantially arcuate region 163. The fiber 160 also includes an outer cladding 164 and a deposited stress region 166, each with a substantially elliptical cross-section. The fiber 160 also includes an inner clad 168 and a core 170, each with a substantially circular cross-section. The elliptical outer cladding 164 and the stress region 166, along with the circular inner clad 168 and core 170, provide a waveguiding region 161. The vertex 165 of the drawn fiber 160 will be more or less arcuate, depending on the shape of the preform 150. A sharp fiber vertex is difficult to achieve, as it tends to undergo some rounding, even at the lowest draw temperatures. Since a sharp vertex is not required for passive alignment along the planar surface, this presents no alignment difficulty and also allows less stringent dimensional requirements for a substantially V-shaped alignment groove in which the optical fiber 160 is to be mounted.

Figure 3:
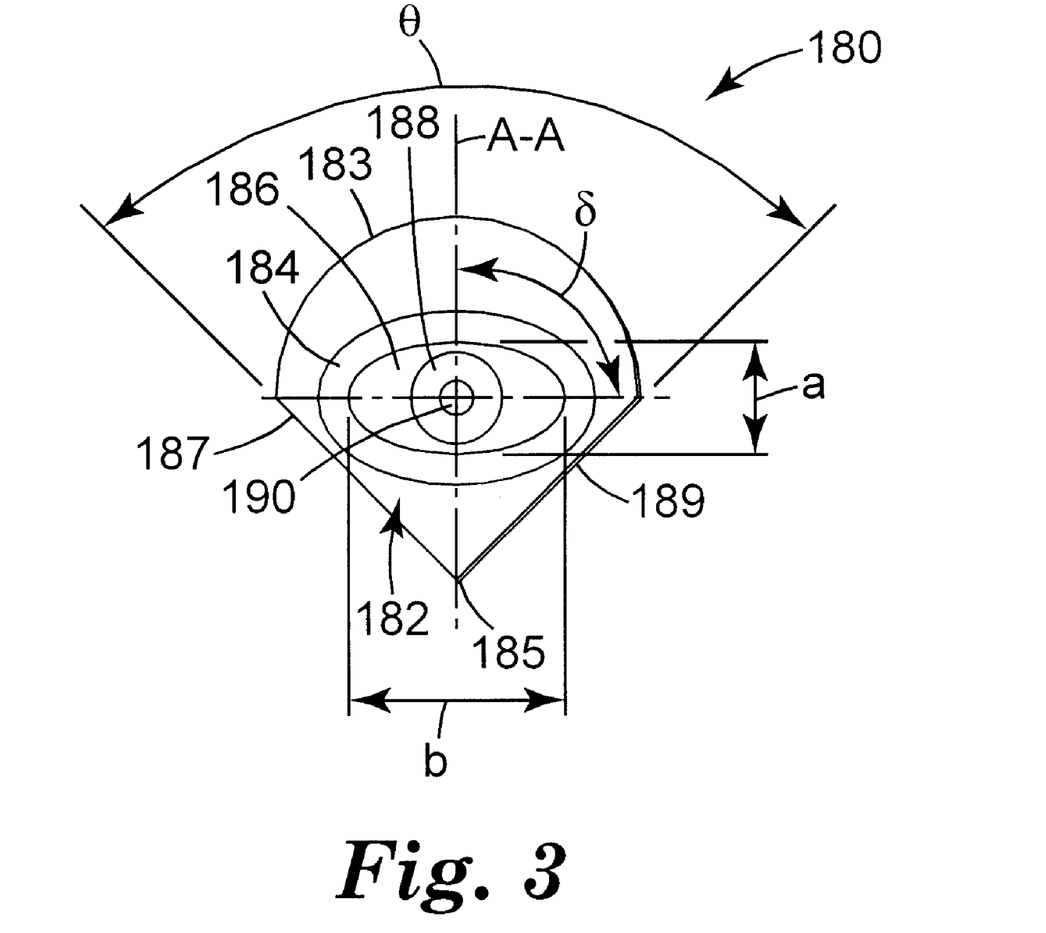
FIG. 3 is a schematic cross-sectional view of an embodiment of a highly birefringent, elliptically clad optical fiber made using the process of the present invention.

A cross section of another drawn fiber 180 is shown in FIG. 3. The fiber 180 has a cross-sectional profile with a first substantially planar surface 187 and a second substantially planar surface 189 in the support tube region 182. The cross sectional profile of the fiber 180 also features an arcuate surface 183 in the support tube region 182. A core 190 and an inner cladding region 188 each have a substantially circular cross sectional shape. In this embodiment, the deposited outer cladding region 184 and the stress region 186 have a substantially elliptical cross section with a major axis b and a minor axis a. The axes a and b of the elliptical stress region also define the respective transverse, orthogonal polarization directions for the fiber 180. In this example, a line A—A bisecting the vertex 185 of the V-shaped cross section and the arcuate surface 183 is aligned at an angle δ of 90° with respect to the major axis b of the elliptical stress region, which enables rapid visual identification of the polarization directions of the fiber 180. Of course, depending on the alteration of the circularized preform (See FIGS. 2(c) and 2(d)) by, for example, grinding or chemical vapor deposition, the non-circular cross-sectional features of the fiber 1 80 and the transverse polarization axes of the fiber 180 may be associated with one another in a myriad of different ways.

In this embodiment, the elliptical portions of the drawn fiber 180 have an ellipticity, defined by the formula (b−a)/(b+a), of about 0.20 to about 0.70, preferably about 0.30 to about 0.40 for PM fibers, and preferably about 0.40 to about 0.70 for PZ fibers. Since the core is not under any significant stress during the heating and circularizing process, it retains its original shape from the preform, even for relatively high concentrations of core and inner cladding (Iclad) dopants.

To minimize bend-induced cross-coupling and maximize mechanical protection, one or more coatings (not shown in FIG. 2) may be applied in a conventional manner during the draw.

The process of the invention has been illustrated with embodiments directed to elliptical cladding starting preform designs. However, any type of highly birefringent preform design with any core shape may be used in the process of the invention. Referring to FIGS. 4(a)–4(h), several examples of V-shaped highly birefringent optical fibers are shown.

Figure 4A:
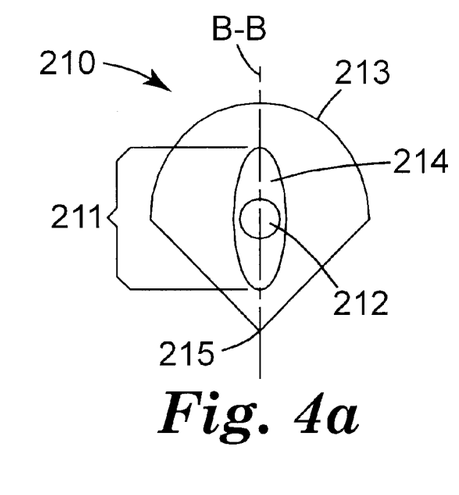
FIGS. 4(a)–4(h) are cross sectional views of V-shaped highly birefringent optical fibers.

FIG. 4(a) is an optical fiber 210 with a core 212 having a substantially circular cross section and a cladding 214 with a substantially elliptical cross section. In this example the elliptical waveguiding region of the fiber 211 has a major axis inclined at an angle $\delta=0°$ with respect to a line B—B bisecting the vertex 215 and the arcuate surface 213 of the fiber 210.

Figure 4B:
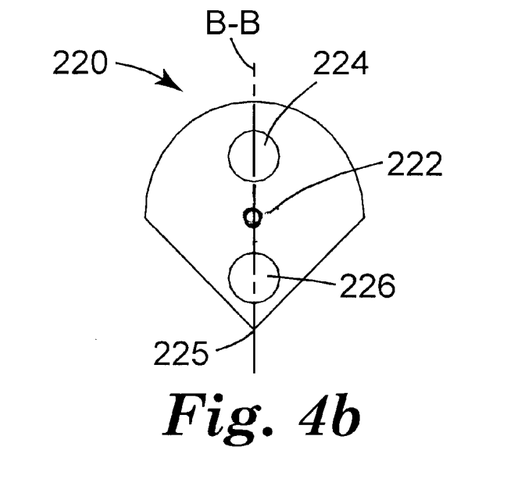

FIG. 4(b) is a PANDA optical fiber 220 with a core 222 having a substantially circular cross section and diametrically opposed stress-applying regions 224, 226 aligned at an angle $\delta=0°$ with respect to line B—B.

Figure 4C:
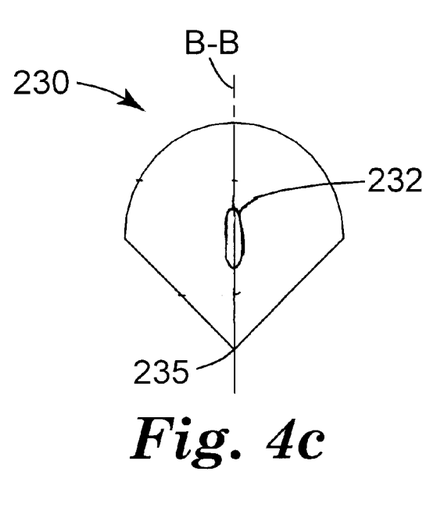

FIG. 4(c) is a highly birefringent optical fiber 230 with core 232 having a substantially elliptical cross section. The major axis of the core 232 is aligned at an angle $\delta=0°$ with respect to the line B—B.

Figure 4D:
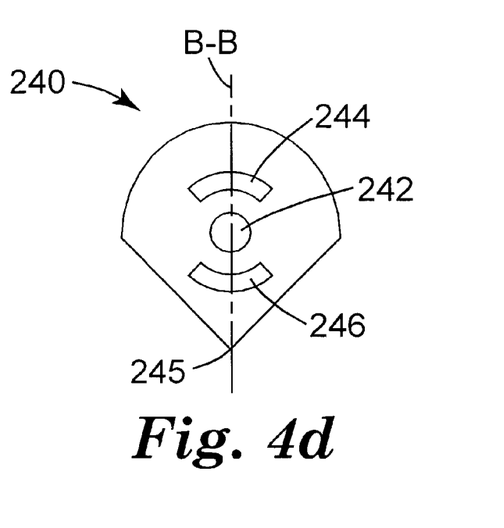

FIG. 4(d) is a bow tie polarization maintaining fiber 240 having a core 242 with a substantially circular cross section and diametrically opposed stress-applying regions 244, 246, each with a substantially arcuate cross section. Again, the birefringent portion of the optical fiber is inclined at an angle of $\delta=0°$ with respect to the line B—B.

Figure 4E:
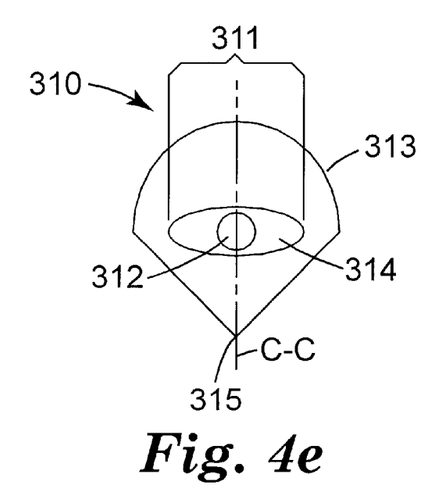

FIG. 4(e) is an optical fiber 310 with a core 312 having a substantially circular cross section and a cladding 314 with a substantially elliptical cross section. In this example the elliptical waveguiding region 311 of the fiber has a major axis inclined at an angle $\delta=90°$ with respect to a line C—C bisecting the vertex 315 and the arcuate surface 313 of the fiber 310.

Figure 4F:
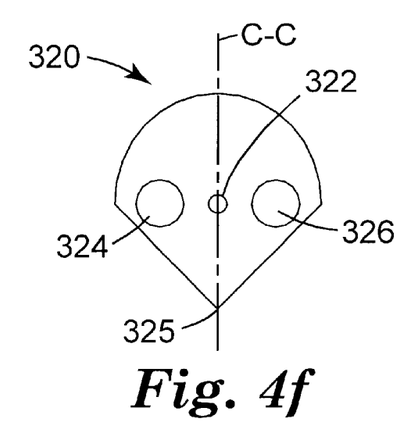

FIG. 4(f) is a PANDA optical fiber 320 with a core 322 having a substantially circular cross section and diametrically opposed stress-applying regions 324, 326 aligned at $\delta_{32}$ 90° with respect to line C—C.

Figure 4G:
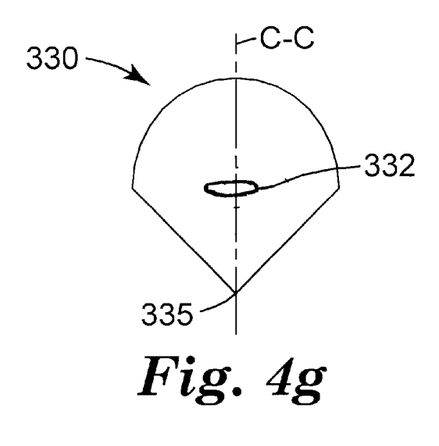

FIG. 4(g) is a highly birefringent fiber 330 with core 332 having a substantially elliptical cross section. The major axis of the core 332 is aligned at $\delta=90°$ with respect to the line C—C.

Figure 4H:
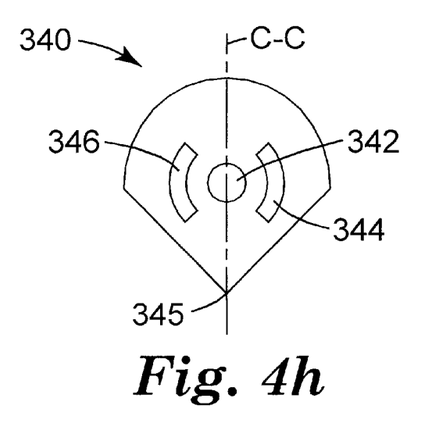

FIG. 4(h) is a bow tie polarization maintaining fiber 340 having a core 342 with a substantially circular cross section and diametrically opposed stress-applying regions 344, 346, each with a substantially arcuate cross section. The axis through the core and the stress applying regions of the optical fiber is inclined at $\delta=90°$ with respect to the line C—C.

FIGS. 5(a)–(d) show a sequence of grind steps that may be used to from an elliptically clad preform 410 with a V-shaped region having a vertex angle $\theta=90°$ and in which a line D—D, bisecting a vertex and an arcuate surface, is inclined at $\delta=90°$ with respect to the slow or major axis 402 (0° with respect to the fast or minor axis 401). The substantially round preform 410 has a core 412 with a substantially round cross section and a cladding 414 with a substantially elliptical cross section.

Figure 5A:
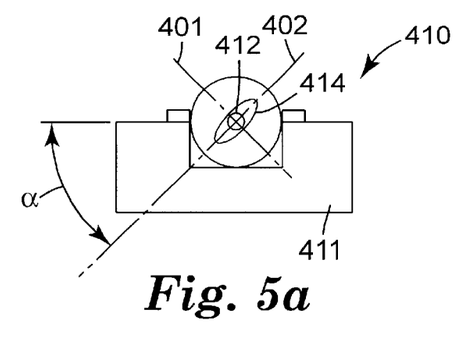
FIGS. 5(a)–5(d) show a sequence of grind steps that may be used to form an elliptically clad preform with a V-shaped region having a vertex angle θ=90° and inclined at δ=90° with respect to the slow or major axis of the drawn fiber.

Referring to FIG. 5(a), the preform 410 is placed in a jig 411 with the preform's slow axis 402 oriented at an angle $\alpha=45°$ to a surface grinder (not shown). The preform 410 may include an optional alignment feature on its outer surface such as, for example, an uncircularized flat region, to simplify this alignment step. A polarimeter used with a rotational preform holder can also be used to locate the polarization angles within about±1°.

Figure 5B:
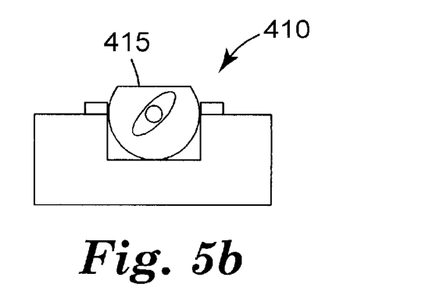
Figures 5C, 5D:
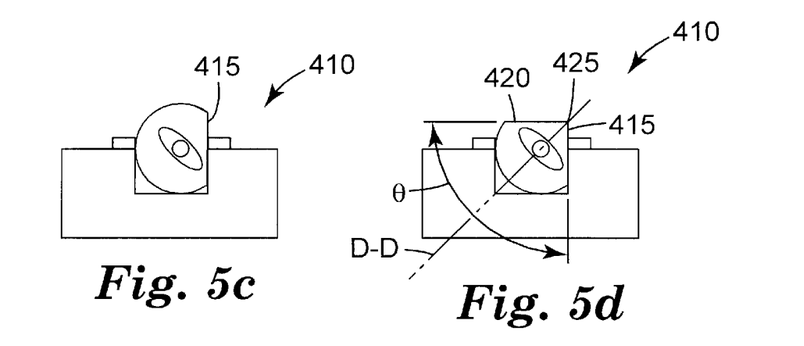

As shown in FIG. 5(b), a first substantially flat surface 415 is then ground into the length of the preform 410. In FIG. 5(c), the preform 410 is rotated 90° clockwise. Referring to FIG. 5(d), a second flat surface 420 is formed at an angle $\theta=90°$ to the first flat surface 415 by grinding to an equal depth. Depending on the depth of the grind, either a sharp V-shaped vertex 425 can be formed by a deep grind (as shown) or a more rounded vertex can be formed by a shallower grind.

The non-elliptically clad birefringent fibers shown in FIGS. 4(b)–(d) and 4(f)–(h) may be drawn from similarly shaped preforms that were fabricated using the grind sequences for FIG. 5 above or FIGS. 6–8 below.

Figure 6A:
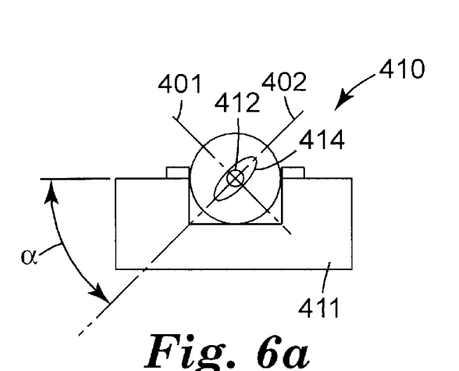
FIGS. 6(a)–6(d) show a sequence of grind steps that may be used to form an elliptically clad preform wit,h a V-shaped region having a vertex angle θ=90° and inclined at δ=0° with respect to the slow or major axis of the drawn fiber.
Figure 6B:
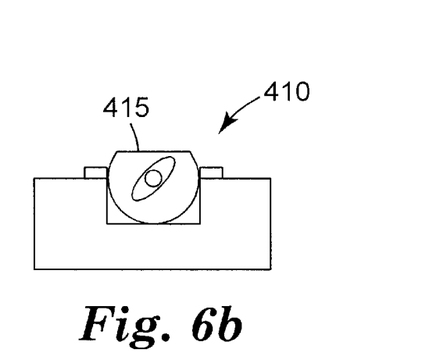
Figure 6C:
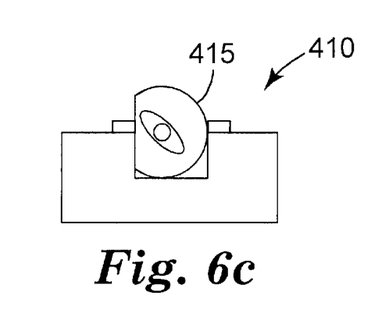
Figure 6D:
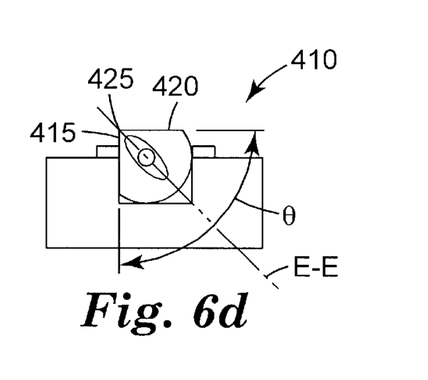

FIGS. 6(a)–(d) depict a near identical sequence making a PM preform having a vertex angle of $\theta=90°$ and a slow axis at an angle $\delta=0°$ with respect to a line E—E though its vertex 425. The steps in FIGS. 6(a) and 6(b) are the same as in FIGS. 5(a) and 5(b) to form a first substantially planar surface 415. In FIG. 6(c), the preform 410 is rotated 90° in a counterclockwise direction to orient the preform for the second grind. In FIG. 6(d), the preform is ground a second time to form a second substantially planar surface 420 at an angle $\theta$ of 90° with respect to the first planar surface 415.

It is not necessary for the vertex angle $\theta$ of the V-shaped highly birefringent optical fibers to be 90° as shown in the above embodiments. A myriad of other vertex angles are desirable in the art, such as, for example a 70.53° vertex angle. A highly birefringent optical fiber having this vertex angle will precisely fit into an etched silicon surface that is common to the fabricators of interconnects for interfacing to planar waveguides.

FIGS. 7(a)–(d) show a sequence of grind steps that may be used to create a preform with a V-shaped region having a vertex angle $\theta=70.53°$. In the finished preform 510, the slow or major axis 502 is inclined at an angle $\delta=0°$ with respect to a line F-F bisecting the vertex 525 (90° with respect to the fast or minor axis 501). The preform 510 has a substantially round cross section, and includes a core 512 with a substantially round cross section, as well as a cladding 514 having a substantially elliptical cross section.

Figure 7A:
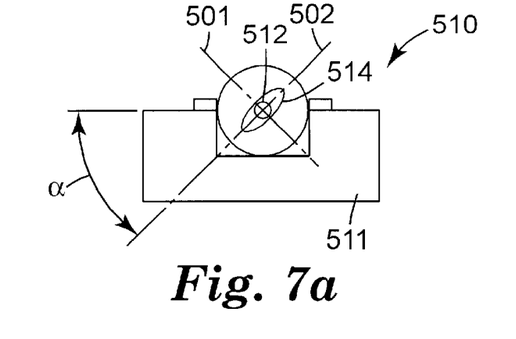
FIGS. 7(a)–7(d) show a sequence of grind steps that may be used to create a preform with a V-shaped region having a vertex angle θ=70.53° and inclined at an angle δ=0° with respect to the slow or major axis of the drawn fiber.
Figure 7B:
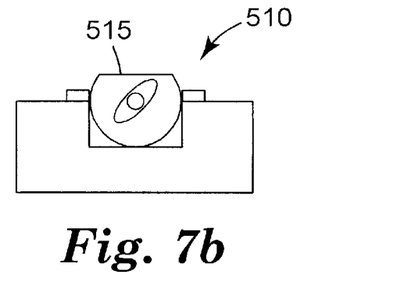
Figure 7C:
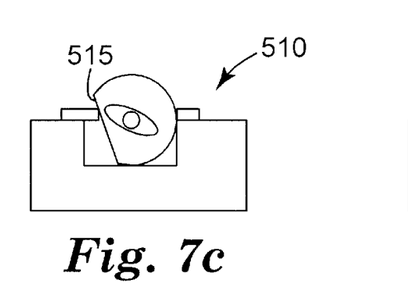
Figure 7D:
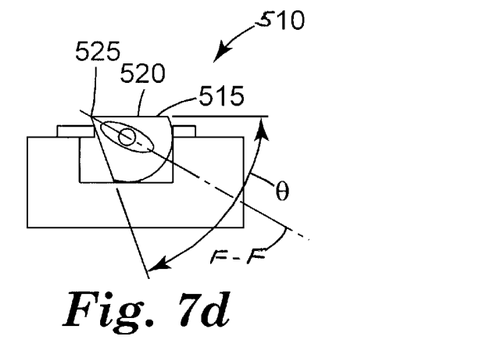

Referring to FIG. 7(a), the preform 510 is placed in a jig 511 with the preform's slow axis 502 oriented at an angle $\delta=35.26°$ to a surface grinder (not shown). As noted above, an alignment feature on the surface of the preform may be used to simplify the alignment portion of this step. As shown in FIG. 7(b), a first substantially planar surface 515 is then ground into the length of the preform 510. In FIG. 7(c), the preform 510 is rotated 109.47° counterclockwise. A second substantially planar surface 520 is formed in FIG. 7(d) at an angle $\theta$ of 70.53° to the first flat 515 by grinding to an equal depth. Depending on the depth of the grind, either a sharp V-shaped vertex 525 can be formed by a deep grind (as shown) or a more rounded vertex can be formed by a shallower grind.

Figure 8A:
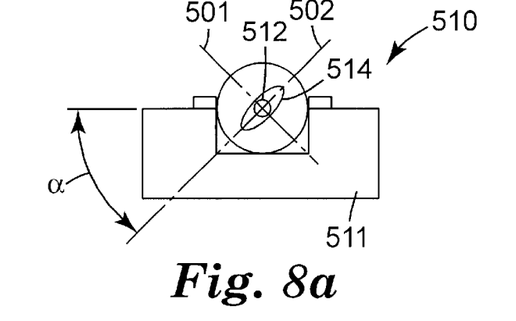
FIGS. 8(a)–8(d) depict a sequence of grind steps that may be used to create a preform with a V-shaped region having a vertex angle θ=70.53° and inclined at an angleδ=90° with respect to the slow or major axis of the drawn fiber.
Figure 8B:
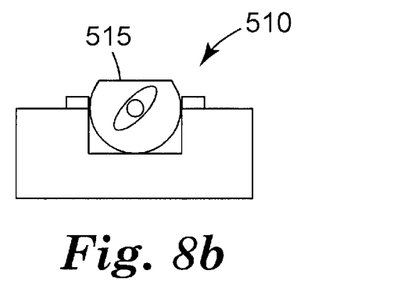
Figure 8C:
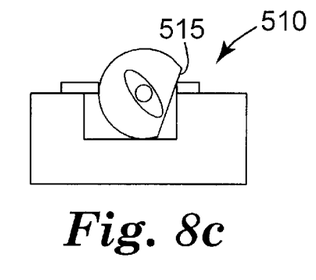
Figure 8D:
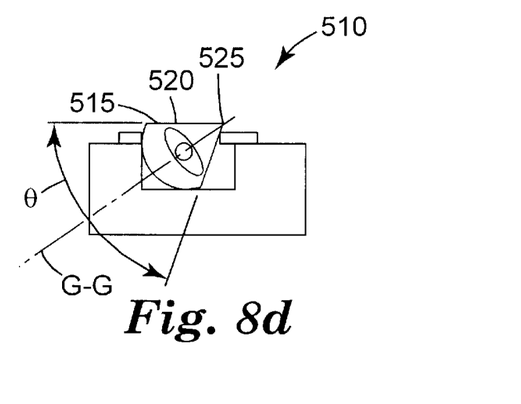

FIGS. 8(a)–(d) depict a slightly modified sequence of grind steps that may also be used to create a preform with a V-shaped region having a vertex angle $\theta=70.53°$. In the finished preform 510, the slow or major axis 502 is inclined at an angle $\delta=90°$ with respect to a line G—G through the vertex 525 (0° with respect to the fast or minor axis 501). The steps shown in FIGS. 8(a) and 8(b) are the same as in FIGS. 7(a) and 7(b) to form a first flat surface 515, except that the preform's slow axis 502 is oriented at an angle a 54.74° to a surface grinder (not shown). In FIG. 8(c), the preform 510 is rotated 109.470 in a clockwise direction to orient the preform 510 for the second grind. In FIG. 8(d), the preform 510 is ground a second time to form a second flat surface 520 at an angle $\theta$ of 70.53° to the first flat surface 515.

The ground preforms with the substantially V-shaped cross sectional profiles may be drawn at high tension at a relatively low temperature and/or high speed to retain the features of the preform. One or more coatings can be applied in the conventional manner during the draw thereby minimizing bend induced cross-coupling and maximizing mechanical protection.

Figure 9:
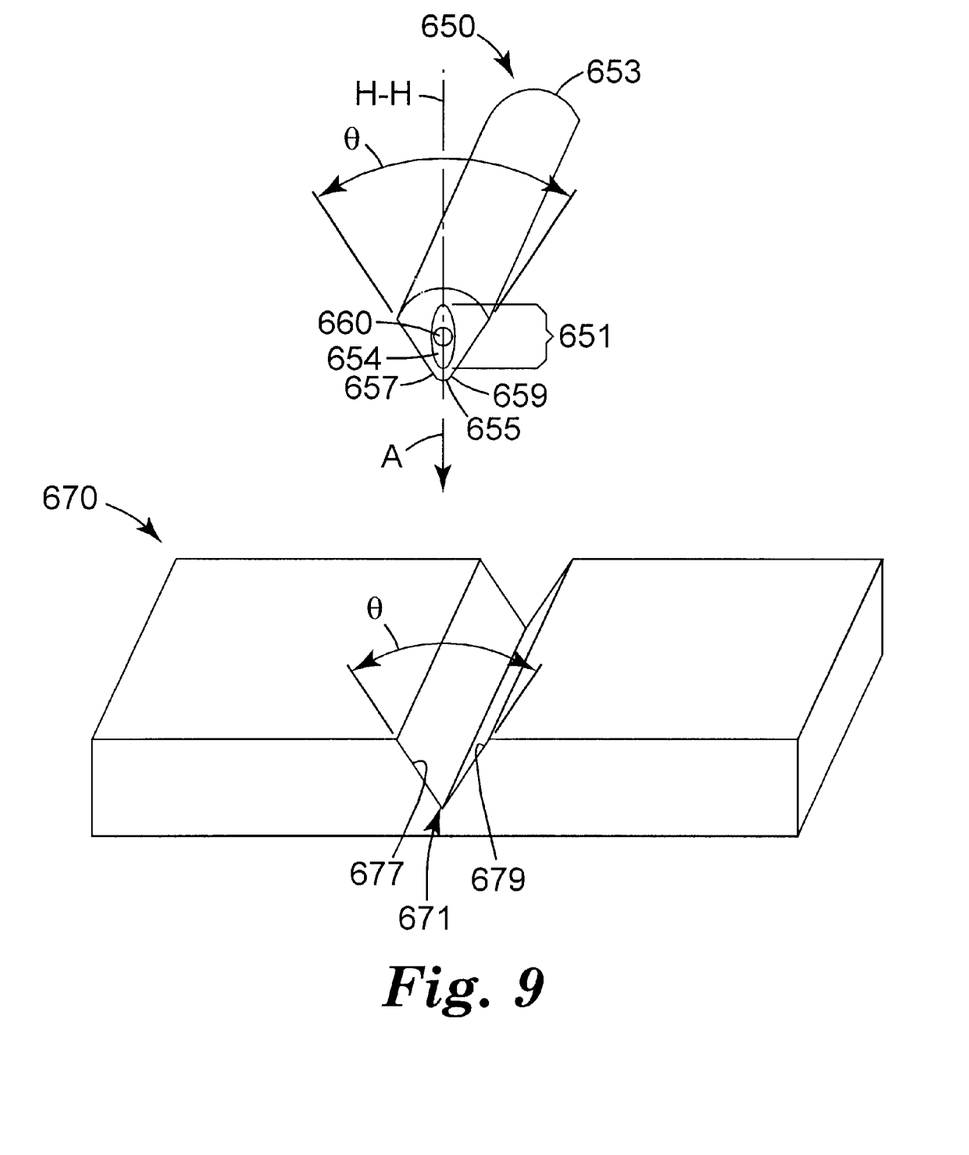
FIG. 9 is a schematic representation of an interconnection procedure for a highly birefringent optical fiber and a device.

Referring to FIG. 9, a method is illustrated for connecting a shaped highly birefringent fiber 650 with a substantially V-shaped cross section to an alignment portion of a device 670. The optical fiber 650 includes a waveguiding region 651 having a core 660 with a substantially circular cross section, and a cladding region 654 with a substantially elliptical cross section. The fiber 650 has a first substantially planar surface 657 and a second substantially planar surface 659, an arcuate surface 653, and a substantially arcuate vertex 655. The first and second substantially planar surfaces 657, 659 are inclined at an angle $\theta=70.53°$. The major polarization axis of the optical fiber is inclined at $\delta=0°$ with respect to a line H—H bisecting the vertex 655 of the optical fiber 650.

The device 670 includes a connection region 671 shaped to accept the substantially V-shaped cross-sectional geometry of the optical fiber 650. The connection region 671 includes opposed substantially planar surfaces 677, 679 inclined at an angle $\theta=70.53°$. When the optical fiber 650 is moved in the direction of arrow A and is placed into the connection region 671, the planar surfaces of the fiber 657, 659 engage the corresponding planar surfaces 677, 679 of the connection region. This engagement locks the optical fiber 650 into a specific rotational alignment.

Figure 10:
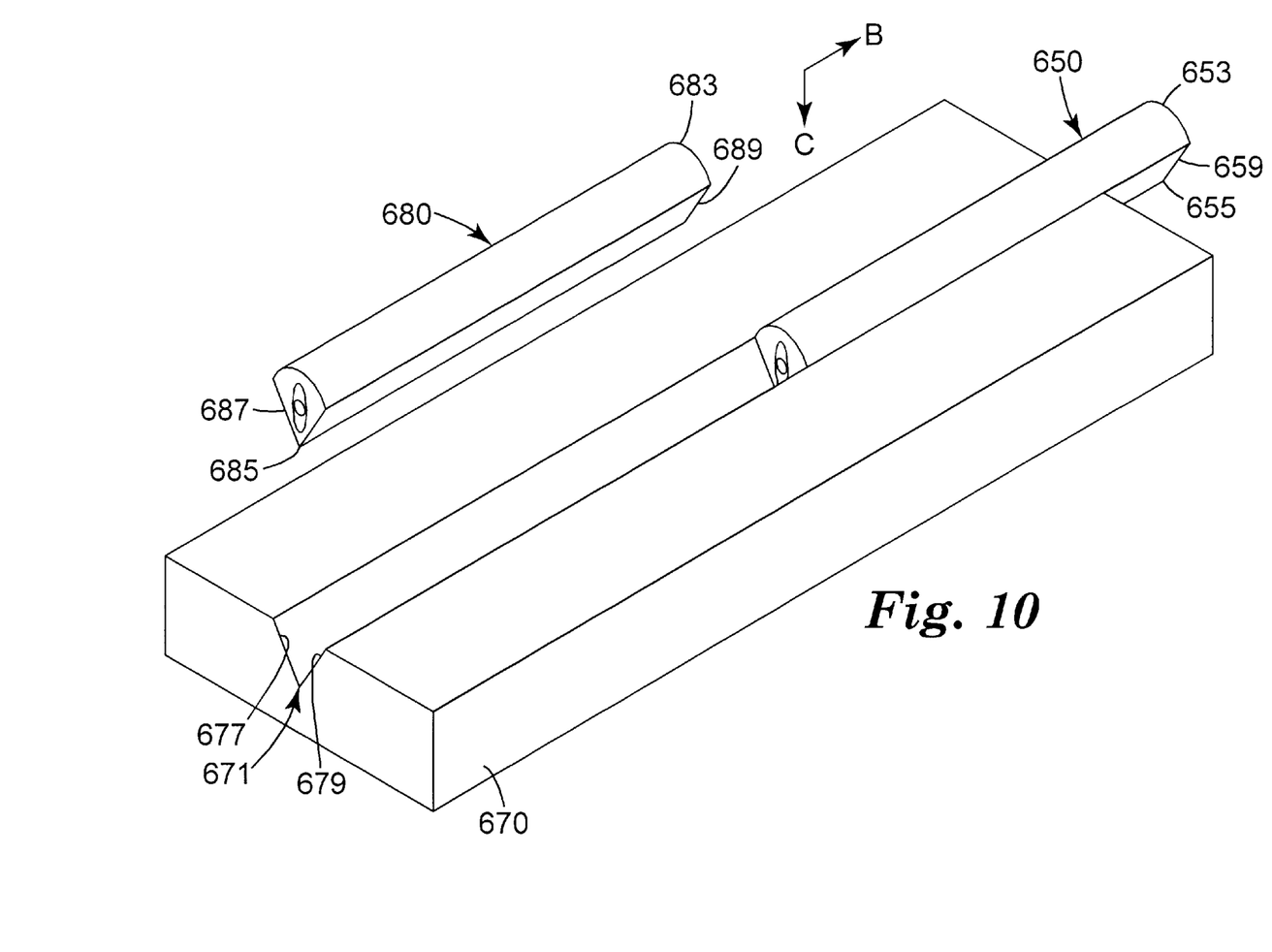
FIG. 10 is a schematic representation of an interconnection procedure.

Referring to FIG. 10, the substantially V-shaped highly birefringent optical fiber 650 is shown secured in the connection region 671 of the device 670. A second substantially V-shaped highly birefringent optical fiber 680 with a cross sectional profile having, for example, planar surfaces 687, 689 and an arcuate surface 683 corresponding to the surfaces 657 (see FIG. 9), 659 and 653 in the optical fiber 650 may then be moved in the direction of arrows B and C, and inserted into the connection region 671. The fiber 680 may be placed in an abutting, end-to-end relationship with the optical fiber 650 and secured into position with an adhesive or a clamp (not shown in FIG. 10). Assuming that the polarization directions of the fibers 650 and 680 are similarly aligned with respect to their non-circular outer shapes, the interlocking interconnection greatly simplifies the connection process, and eliminates the need for time consuming rotational alignment procedures.

The example of FIG. 10 illustrates how two substantially identically shaped highly birefringent optical fibers might be interconnected, but it should be understood that the shaped birefringent optical fibers described in this application may be easily interconnected with other devices such as detectors, polarized light sources, laser diodes, modulators, switches and the like.

The invention will now be described with reference to the following non-limiting example.

EXAMPLE

A single mode preform similar to the design shown in FIG. 2(a) was fabricated using well-known MCVD processes. A matched-index cladding design was chosen and included both deposited outer and inner cladding regions surrounding a stress region. In this example the inner and outer claddings were formed from phosphorous fluorosilicate glass, although other compositions, including germanium fluorosilicate glass and pure $SiO_2$, may be used, depending on the desired properties of the fiber. The stress-applying region was made up of a germanium phosphorous borosilicate glass composition that resulted in an index matched to the claddings. Finally, the core region was made up of germanium doped silica layers.

This preform measured 11.7 mm in diameter in its collapsed state. Additional outer cladding glass was then added by overcollapsing a 19×25 mm General Electric synthetic fused silica tube over the preform, which resulted in an overall diameter increase to 19.2 mm.

The preform was then "stretched" on a lathe with a translatable chuck to 14.7 mm in diameter using a torch feed rate of 5.8 mm/min and a pull rate of 4.3 mm/min at a temperature of 2270° C. With higher capacity torches or smaller preforms, this step could be eliminated. The stretched preform was then ground 3.17 mm on opposite sides, resulting in a preform with dimensions of 14.6 mm×8.30 mm.

Circularization was accomplished using both a slowly translating $H_2/O_2$ torch and stretching. The preform reached a temperature of 2309° C. during this step. The torch moved along the preform at the rate of 14 mm/min while the movable chuck was stretching the preform at a 1.35 mm/min rate. This process resulted in a preform with a minimum dimension of 10.0 mm and a maximum dimension of 11.8 mm, corresponding to the major and minor axes of the internal elliptical cladding, respectively.

In this instance, it was desired to create a 125 $\mu$m diameter fiber for operation at a wavelength of 1550 nm, so no overcollapse was needed to lower the core to clad ratio. A 12 mm length of the ground preform was left uncircularized as a reference alignment feature to aid in locating the plane of polarization parallel to the fast axis. With the flat alignment feature of the preform positioned perpendicular to the horizontal surface of the holding feature, the preform was rotated 54.74° counterclockwise ($\alpha=54.74°$ from the plane through the slow axis, as shown in FIG. 8(a)).

After securing the rotated preform in place on the grinder, a 1.40 mm flat was ground into the upper surface of the preform, the preform rotated 109.47° clockwise and the second flat side added. This resulted in preform with a rounded vertex.

This preform was drawn and coated with a single coating at a speed of 90 m/min and a preform feed rate of 12.2 mm/minute. Using open loop control, this resulted in a fiber with a maximum dimension across the rounds of 136 $\mu$m and 116 $\mu$m across the wings. Alignment of the slow axis to the perpendicular to the vertex was within 2°. The extinction ratio of the fiber, measured at 1550 nm, was 42.5 dB. The beatlength of this fiber, measured at 630 nm, was 2.2 mm.

Other embodiments are within the scope of the following claims.

What is claimed is:

1. A method for making a V-shaped highly birefringent optical fiber, comprising:
    (a) providing a preform with a substantially circular cross section, wherein the preform comprises a core region and a cladding region adjacent the core, wherein the cladding region has a substantially elliptical cross section;
    (b) modifying an outer surface of the preform to create a shaped preform with a substantially V-shaped cross section; and
    (c) drawing the shaped preform at a temperature and draw rate sufficient to provide an optical fiber with the substantially V-shaped cross section of the shaped preform, wherein a major axis of the substantially elliptical cross section of the cladding region is inclined at an angle of: (i) 0°; or (ii) 90°, with respect to a line bisecting a vertex of the V-shaped cross section of the optical fiber.

2. The method of claim 1, wherein the core region has a substantially circular cross section.

3. The method of claim 1, wherein the core region has a substantially elliptical cross section.

4. The method of claim 1, wherein at least one of the core region and the cladding region has two substantially perpendicular planes of symmetry.

5. The method of claim 1, wherein the shaping step (b) comprises removing material from the preform.

6. The method of claim 1, wherein the cladding region has a first transverse polarization axis and a second transverse polarization axis orthogonal to the first transverse axis, and the outer surface of the optical fiber has a known orientation to the first and second transverse polarization axes.

7. A method for making a V-shaped highly birefringent optical fiber, comprising:
   (a) providing a first preform comprising a substantially circular core and a substantially circular-cladding adjacent the core, and a support region surrounding the waveguiding region;
   (b) modifying an outer surface of the support region of the first preform to form a second preform with a non-circular cross section;
   (c) circularizing at least part of the second preform to provide a third preform with a substantially circular cross section, wherein the third preform comprises a core with a substantially circular cross section, and a cladding adjacent the core, wherein the cladding has a substantially elliptical cross section;
   (d) modifying an outer surface of the third preform to create a fourth preform, wherein the fourth preform has a substantially V-shaped cross section; and
   (e) drawing the fourth preform at a temperature and draw rate sufficient to provide an optical fiber with the substantially V-shaped cross section of the fourth preform, wherein a major axis of the substantially elliptical cross section of the cladding is inclined at an angle of: (i) 0°; or (ii) 90°, with respect to a line bisecting a vertex of the V-shaped cross section of the optical fiber.

8. The method of claim 7, wherein the cladding region has a first transverse polarization axis and a second transverse polarization axis orthogonal to the first transverse polarization axis, and said substantially V-shaped cross section has a known orientation to the first and second transverse polarization axes.

9. The method of claim 7, wherein step (b) comprises grinding the first preform such that the cross section of the second preform has first substantially planar surface and a second substantially planar surface opposite the first planar surface.

10. The method of claim 7, wherein the second preform is circularized such that the third preform has a substantially circular cross section with an externally detectable alignment feature.

11. The method of claim 10, wherein the cladding region has a first transverse polarization axis and a second transverse polarization axis orthogonal to the first transverse polarization axis, and said alignment feature has a known orientation with respect to the first and second transverse polarization axes.

12. The method of claims 7, wherein step (d) comprises grinding the third preform such that the cross section of the fourth preform has a first substantially planar surface and a second substantially planar surface, and wherein the first surface and the second surface are inclined at an angle of about 90°.

13. The method of claims 7, wherein step (d) comprises grinding the third preform such that the cross section of the fourth preform has a first substantially planar surface and a second substantially planar surface, and wherein the first surface and the second surface are inclined at an angle of about 70.53°.

14. The method of claim 7, wherein the draw temperature is about 1600° C. to about 2100° C.

15. The method of claim 7, wherein the draw rate is about 5 m/min to about 200 m/min.

16. A highly birefringent optical fiber comprising a substantially V-shaped cross section, wherein the fiber comprises a core and a cladding adjacent the core, wherein the cladding has a substantially elliptical cross section, and wherein a major axis of the substantially elliptical cross section of the cladding is inclined at an angle of: (i) 0°; or (ii) 90°, with respect to a line bisecting a vertex of the V-shaped cross section of the optical fiber.

17. The fiber of claim 16, wherein the core has a substantially circular cross section.

18. The fiber of claim 16, wherein the core has a substantially elliptical cross section.

19. The optical fiber of claim 16, further comprising a cladding adjacent the core, wherein the cladding has an ellipticity of about 0.20 to about 0.70.

20. A method for making a V-shaped highly birefringent optical fiber, comprising:
   (a) providing a first preform comprising
      a waveguiding region comprising a substantially circular core, and
      a substantially circular cladding adjacent the core;
   (b) shaping an outer surface of the first preform to form a second preform having a cross section with a first planar surface and a second planar surface, wherein the first planar surface is opposite the second planar surface;
   (c) circularizing at least part of the second preform to provide a third preform with a substantially circular cross section, wherein the third preform comprises a core with a substantially circular cross section, and a cladding adjacent the core, wherein the cladding has a substantially elliptical cross section with an ellipticity of about 0.20 to about 0.70;
   (d) shaping the third preform to create a fourth preform, wherein the fourth preform has a cross section comprising a first planar surface and a second planar surface, wherein the first planar surface is inclined at an angle with respect to the second planar surface to create a substantially V-shaped cross sectional profile; and
   (e) drawing the fourth preform at a temperature and draw rate sufficient to provide an optical fiber with the substantially V-shaped cross sectional profile, wherein a major axis of the substantially elliptical cross section of the cladding is inclined at an angle of: (i) 0°; or (ii) 90°, with respect to a line bisecting a vertex of the V-shaped cross sectional profile of the optical fiber.

21. A method for connecting a highly birefringent optical fiber, comprising:
   (a) providing a highly birefringent optical fiber with a substantially V-shaped cross section, wherein the fiber comprises a core and a cladding adjacent the core, wherein the cladding has a substantially elliptical cross section, and wherein a major axis of the substantially elliptical cross section of the cladding is inclined at an angle of: (i) 0°; or (ii) 90°, with respect to a line bisecting a vertex of the V-shaped cross section of the optical fiber;

(b) providing a device comprising a connection surface shaped to accept the substantially V-shaped cross-section of the optical fiber; and (c) engaging the optical fiber with the connection surface in the device, wherein the optical fiber is rotationally aligned with respect to the device.

22. The method of claim 21, wherein the core has a substantially circular cross section.

23. The method of claim 21, wherein the core has a substantially elliptical cross section.

* * * * *

UNITED STATES PATENT AND TRADEMARK OFFICE
CERTIFICATE OF CORRECTION

PATENT NO. : 6,459,838 B1
DATED : October 1, 2002
INVENTOR(S) : Varner, Wayne F.

It is certified that error appears in the above-identified patent and that said Letters Patent is hereby corrected as shown below:

Column 3,
Line 39, delete "makess" and insert in place thereof --makes --.
Line 62, delete "invention be parent" and insert in place thereof -- invention will be apparent --

Column 4,
Line 16, delete "wit,h" and insert in place thereof -- with --.
Line 53, delete "preformns" and insert in place thereof -- preforms --.

Column 5,
Line 55, delete "53" and insert in place thereof -- 153 --.
Line 59, delete the number "0" and insert in place thereof -- $\theta$ --.

Column 7,
Line 37, delete the phrase "$\delta_{32}$ 90°" and insert in place thereof -- $\delta = 90°$ --.

Column 8,
Line 61, delete the words "angle a" and insert in place thereof -- angle $\alpha$ --.
Line 63, delete the number "109.470" and insert in place thereof -- 109.47° --.

Column 11,
Line 24, delete the hyphen between "circular" and "cladding".

Signed and Sealed this

Twenty-ninth Day of July, 2003

JAMES E. ROGAN
*Director of the United States Patent and Trademark Office*